United States Patent [19]

Settlemyer

[11] 4,153,434

[45] May 8, 1979

[54] EMERGENCY STANDBY AIR DRYING BACK-UP SYSTEM

[75] Inventor: Bernard W. Settlemyer, Longmont, Colo.

[73] Assignee: General Cable Corporation, Greenwich, Conn.

[21] Appl. No.: 909,383

[22] Filed: May 25, 1978

Related U.S. Application Data

[63] Continuation-in-part of Ser. No. 674,426, Apr. 7, 1976, abandoned.

[51] Int. Cl.² .................. B01D 53/04; B01D 53/26
[52] U.S. Cl. ........................... 55/163; 55/179; 55/217; 55/275; 55/387; 62/176 R
[58] Field of Search .............. 55/31, 33, 34, 58, 62, 55/163, 179, 217, 275, 387, 389; 62/11, 176

[56] References Cited

U.S. PATENT DOCUMENTS

| | | | |
|---|---|---|---|
| 3,069,830 | 12/1962 | Skarstrom et al. | 55/58 |
| 3,192,686 | 7/1965 | Berkey et al. | 55/62 X |
| 3,225,517 | 12/1965 | Wachsmuth | 55/31 |
| 3,323,291 | 6/1967 | Kern | 55/179 X |
| 3,448,561 | 6/1969 | Seibert et al. | 55/163 X |
| 3,659,399 | 5/1972 | Kaur, Jr. et al. | 55/163 X |

OTHER PUBLICATIONS

Deltech Air Dryer Inst. Manual, 1968 copyright, Deltech Eng., Inc., New Castle, Del.

Primary Examiner—Robert H. Spitzer
Attorney, Agent, or Firm—Roy C. Hopgood; John M. Calimafde; Charles W. Neill

[57] ABSTRACT

In some critical use, air-drying systems, 100% back-up capability is desired. The problem has been that an idle standby unit requires considerable time to reach full capability for dry air delivery. This invention bleeds enough dry air from the operating primary unit through parts of the idle back-up unit to maintain any dynamic conditions that are necessary to keep the standby unit ready for immediate use in the event of a failure of the primary unit.

13 Claims, 3 Drawing Figures

EMERGENCY STANDBY AIR DRYING BACK-UP SYSTEM

RELATED APPLICATION

This application is a continuation-in-part of my application Ser. No. 674,426, filed Apr. 7, 1976, now abandoned.

BACKGROUND AND SUMMARY OF THE INVENTION

In air-drying systems, where a continuous supply of air is critical, it has been the practice to have an emergency standby air-drying back-up system capable of taking over the full demand for dry air in the event of a failure of the primary system. In the prior art, the standby unit has required time after starting in which to reach full capability for dry air delivery. This lag has resulted in loss of dry air for a time at the point of use. The primary dry air supply system and the emergency standby system each comprise a complete system with its compressor, air-dryer, valves, regulators and alarm sensors for detecting increase in humidity or other conditions indicating changes from the desired operating conditions for the system, and the primary system and standby system are each capable of supplying the full demand for dry air or other gas to a place of use when the other system is not in operation and for indefinite periods of time such as a day or a plurality of successive days.

Where a standby system has remained idle for a substantial length of time, certain parts of the system may not remain in condition for instant operation; for example, a drying system having an adsorptive air dryer requires sufficient quantity of air to maintain positive regeneration flow on the adsorptive air dryer to prevent wetting of the adsorbent due to breathing atmospheric air or other moisture sources during extended standby periods.

This invention keeps the standby unit in condition for instant operation by maintaining any dynamic conditions necessary to keep the standby unit in an active or ready condition.

This result is accomplished by bleeding some of the dry air from the operating primary system into parts of the idle back-up system. The quantity of air supplied depends on the type of drying system used in the back-up system. In addition to the adsorptive air dryer, mentioned above, a standby system with a refrigerator dryer must be supplied with a flow sufficient to prevent extreme low temperatures that would cause frosting or freeze-up of the heat exchanger to an extent which would require considerable operation of the back-up system before it would be operating normally.

Other examples of maintaining dynamic conditions in the standby system include the supplying of sufficient air to maintain proper pressure swing development for a heaterless adsorptive drying system; and a flow sufficient to maintain all of the dry air delivery circuits of the standby unit in a low humidity condition. The compressor of the standby unit is deactivated while the parts of the standby or back-up unit are maintained in the necessary dynamic conditions for instant use by the dry air which is bled off from the primary air-drying system to parts of the standby system.

Other objects, features and advantages of the invention will appear or be pointed out as the description proceeds.

BRIEF DESCRIPTION OF DRAWINGS

In the drawings, forming a part hereof, in which like reference characters indicate corresponding parts in all the views.

DESCRIPTION OF PREFERRED EMBODIMENT

Figure 1:
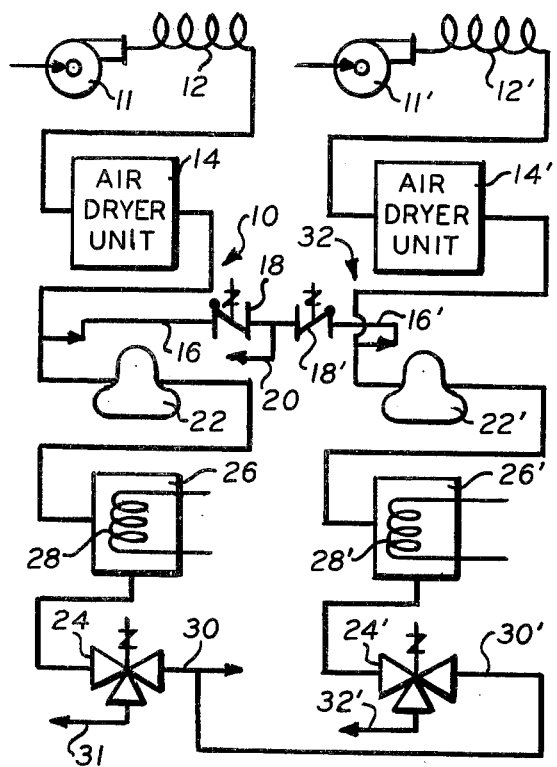
FIG. 1 is a diagrammatic view showing the prior art for energency standby air-drying back-up systems.

FIG. 1 is a diagrammatic view showing the prior art. A primary air-drying system 10 includes a compressor 11 which discharges air through an after-cooler 12 and through an air-drying unit 14 to a high-pressure delivery line 16.

There is a valve 18 in the high-pressure delivery line, and this valve 18 may be a check valve for preventing backflow toward the air dryer unit 14. Beyond the check valve 18, the high-pressure delivery line 16 connects with piping 20 which leads to the point of use of the dry air supply from the primary air-drying system 10.

The air dryer unit 14 also supplies air to a regulator 22 which leads to a valve block 24. There is an alarm sensor 26 in series with the discharge from the regulator 22, and this alarm system 26 includes a detector 28 responsive to excess humidity, or pressure, or temperature, or various other characteristics of the air which would indicate malfunctioning of the primary system 10; but the principal characteristic which the alarm sensor 26 must detect is rise in humidity above the maximum acceptable at the point of use of the air being supplied by the primary air-drying system 10.

The valve block 10 includes a valve that supplies low pressure air to piping 30 that leads to a location of use for low-pressure dry air. The valve block 24 also includes a bypass 31 through which air can flow to maintain the alarm system 26 operative when no air is being drawn from the piping 30'.

A standby air-drying back-up system 32 is of the same construction as the primary system 10, and corresponding parts in the standby back-up system 32 are indicated by the same reference characters as in the primary unit 10 but with a prime appended to each of the reference characters. The back-up system 32 supplies low-pressure air through the piping 30' to the piping 30 which leads to the location where low-pressure air is used.

The valve 18' prevents any air from the primary system 18 from entering the back-up system 32; and the valve 18 prevents any air from the back-up system 32 from entering the primary system 10 when the primary system is not running and the back-up system is in operation. So long as the primary air-drying system 10 is operating satisfactorily, the standby back-up system 32 does not operate to supply dry air.

Each of the systems 10 and 32 may have two or more moisture adsorptive chambers, such as disclosed in U.S. Pat. No. 3,069,830, dated Dec. 25, 1962, which contain adsorbent packing materials. The material in each chamber adsorbs moisture from air passing through it while the material in another chamber has moisture removed from it in preparation for the next cycle of operation of the air-drying unit. Instead of an adsorbent dryer, the unit 14 may be a refrigeration dehumidifier which removes moisture from a gas by condensing it on cold surfaces.

Figure 2:
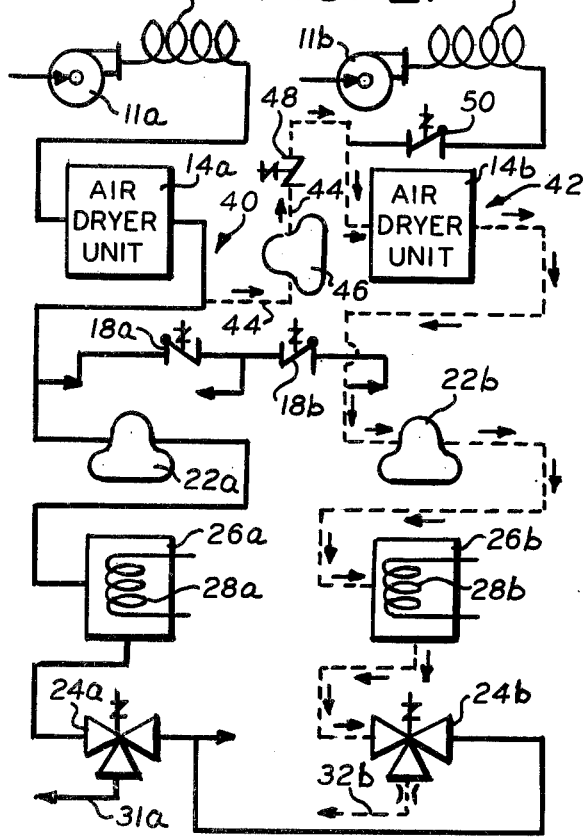
FIG. 2 is a view similar to FIG. 1, but showing the improved construction of the present invention by which the primary system supplies limited quantities of dry air through parts of the back-up system for maintaining it constantly in condition for instant operation when needed.

FIG. 2 shows a combination of a primary and standby or back-up system having the same units as those in FIG. 1 and with the primary system indicated by the reference character 40 and the standby back-up system indicated by the reference character 42. Parts of the system 40 corresponding to those of the system 10 are indicated by the same reference characters as in FIG. 1 but with a letter "a" applied to each reference character. Parts of the standby back-up system 42 which correspond with the system 32 of FIG. 1 are indicated by the same reference characters as in FIG. 1 but with a letter "b" substituted for the prime used in FIG. 1. This invention is not a new type of dehumidifier, but a new correlation between two dehumidifiers, each of which is capable of supplying the full demand for dry air when the other is not in operation but serving as a standby unit for taking over if the first unit breaks down or has to be shut down for servicing or other reasons.

This invention involves interconnections between the systems 40 and 42 which were not used in the prior art shown in FIG. 1. These interconnections involve a bleed connection 44 which is an air line leading from the downstream side of the air dryer unit 14a. This connecting air line 44 includes a pressure regulator 46 that receives high-pressure air from the primary system 40 and that discharges air at reduced pressure through the portion of the connecting air line 44 on the downstream side of the regulator 46, and this regulator is adjustable to change its outlet pressure and thus regulate the rate of flow through the bleed connection 44. A valve 4, which may be a check valve for preventing backflow of air through the connecting air line 44 toward the discharge side of the regulator 46, is in series with the line 44. There is another valve 50, which may be a check valve, for preventing air in the connecting air line 44 from flowing into the after-cooler 12b and to the compressor 11b of the standby back-up system 42.

A limited and controlled amount of dry air from the air dryer unit 14a of the primary system 40 flows through the connecting air line 44, pressure regulator 46 and valve 48 to the upstream side of the air dryer unit 14b of the standby back-up system 42. The amount of air flowing through this connecting air line 44 depends upon the adjustment of the regulator 46; the higher the adjustment of the discharge pressure of the regulator 46, the greater will be the air flow from the primary system 40 to the standby system 42. In actual practice, the amount of air that bleeds from the system 40 to the standby system 42 is a small percentage of the normal output of the compressor 12a.

The piping of the standby system 42 through which air from the connecting air line 44 flows is shown in broken lines in FIG. 2. The amount of air required, for purposes of this invention, depends upon the kind of air dryer unit 14b used in the standby system 42, and upon the alarm sensor 26b and any other apparatus in the standby system 42 which loses its capacity for instantaneous functioning if left completely idle for any extended length of time.

For example, as mentioned earlier in this specification, the air dryer unit 14b may be an adsorptive air dryer; and if this type of air dryer is not in operation, it will usually breathe atmospheric air which enters and leaves the chamber containing the adsorbent as ambient temperature changes expand and contract the air in the air dryer unit 14b. Humid atmospheric air entering the air dryer unit 14 as a result of air contraction in the unit 14b will eventually wet the adsorbent during extended standby periods.

With this invention, the flow of air from the primary system 40 through the connecting air line 44 and through the air dryer unit 14b is adjusted to a rate of flow sufficient to maintain positive regeneration flow on the adsorptive air dryer 14b, so that the air dryer remains in condition for immediate functioning at any time that the standby unit 42 is put into operation by starting the compressor 11b. Other equipment, such as the alarm system 26b, is also maintained in condition capable of immediate use whenever the compressor 11b is operated to supply the full demand for air in place of the primary system 40.

The equipment of the standby system 42 which is maintained ready for operation at any time, without having to go through a time-consuming conditioning period, is described herein as being in "dynamic condition." Thus whenever the standby unit 42 is called upon for immediate action as a result of any operating failure of the primary system 40, the air compressor 11b comes up to speed substantially instantaneously, and all of the units through which air from the compressor 11b flows, finds these subsequent units of the standby compressor 42 in the same dynamic condition when the operation starts as would be the case if there were a warning period for running the standby system 32 of FIG. 1 prior to the breakdown of the primary system 10.

The important consideration to remember in connection with this invention is that while the standby system may be put in operation to relieve the primary system during times of overhaul of the primary system, it is essential, where continuous air flow is critical, that the standby unit be capable of taking over the supply of air, with no advance notice, whenever a detector on the primary system signals a failure by the primary system to supply air under the conditions of temperature, pressure and humidity required for the critical use of the air.

Figure 3:
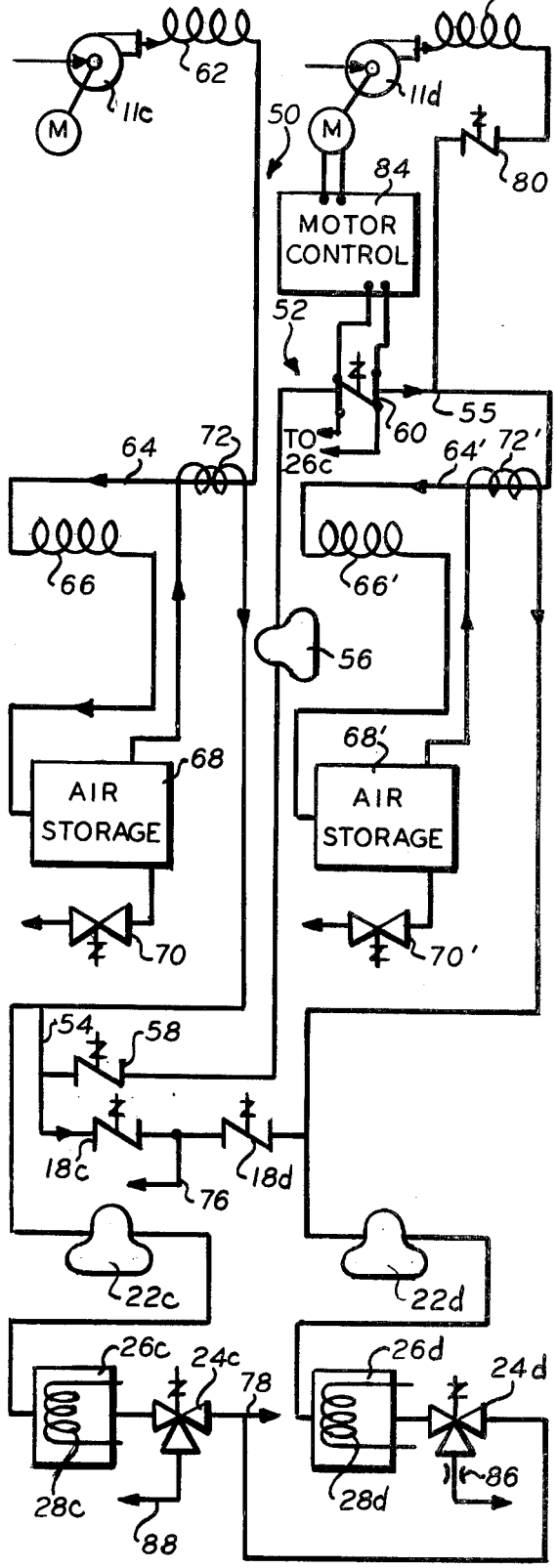
FIG. 3 is a diagrammatic view showing a modified form of the invention utilizing a refrigerated cooler for taking humidity out of the air.

FIG. 3 shows a modification of the invention in which the adsorptive air dryers 14a and 14b of FIG. 2 are replaced by refrigeration air dryers. Parts in FIG. 3 which correspond with those in FIG. 2 are indicated by the same reference numerals but with the letters d and c appended in place of the letters a and b in FIG. 2.

A primary air dryer system 50 is connected with a standby air dryer unit 52 by a bleed connection 54 which corresponds to the bleed connection 44 of FIG. 2. There is a regulator 56 which receives compressed gas from the primary system 50 and delivers this gas at a controlled and reduced pressure to the piping circuit of the standby unit 52 at a connection 55.

There is a valve 58 in the bleed connection 54 on the upstream side of the regulator 56. There is another valve 60 in the bleed connection 54 on the downstream side of the regulator 56. Both of these valves, like the valves in FIGS. 1 and 2, are preferably solenoid-operated, and the valve 58 is constructed so as to operate as a check valve to prevent backflow through the bleed connection 54 in the direction of the primary system 50.

The valve 60 can be constructed to operate as a check valve in the same way as the valve 58, but such check valve operation is not necessary for both of the valves 58 and 60; and the purpose of the valve 60 is to close all flow through the bleed connection 54 in the event that the primary system fails to operate. This prevents humid air from being bled into the standby unit 52.

Air, or other gas which is to be dried, is supplied by the compressor 11c to an after-cooler 62 which removes some of the heat of compression from the air to reduce the load on the refrigerator. From the after-cooler 62, the warm and moist air flows through piping 64 to a coil 66 of a refrigerated cooler which chills the air below its dew point and thereby removes as much moisture as necessary from the air supply.

The air passage from the downstream side of the coil 66 to a chamber 68 from which condensate in the air is discharged, as necessary, through a solenoid-operated valve 70, which can be responsive to the presence of water in the bottom of the chamber 68.

The chamber 68 adds storage capacity to the primary system 50. Air flows from this chamber 68 to a coil of an economizer heat exchanger 72, where the chilled air is in thermal contact with the air flowing to the coil 66 from the after cooler 62.

From the discharge end of the economizer heat exchanger 72, the air flows through piping 74 to the upstream side of a pressure regulator 22c, which receives gas at the substantial pressure at which it is delivered by the compressor 11c and which reduces the gas to a substantially lower pressure, which is regulated in accordance with the requirements for low-pressure at the location where the air is to be used.

The high-pressure air from the upstream side of the regulator 22c—that is, the air at the pressure in the piping 74—flows through a valve 18c to a pipe 76, which leads to a location for use of the high-pressure air. This pipe 76 is also connected, through a valve 18d, with the standby system 52. The valves 18c and 18d may be solenoid-operated valves, and are preferably constructed so that they operate as check valves for preventing any flow of air from the pipe 76 back to the primary system 50 and standby system 52, respectively.

High humidity alarms or sensors 26c and 26d in the primary system 50 and standby system 52, respectively, control valves 24c and 24d, respectively, which connect either the primary system 50 or the standby system 52, whichever is in operation, to supply low-pressure dry air to piping 78, which leads to a location for low-pressure dry air use. This is the same as in FIG. 2.

The construction of the standby system 52 is substantially the same as that of the primary system 50 and corresponding parts in the standby system are indicated by the same reference characters as in the primary system but with a prime appended. A valve 80 is included in the standby unit 52 to prevent flow of air from the bleed connection 54 toward the compressor 11d.

As in the system described in FIG. 2, the air or gas under pressure from the bleed connection 54 flows through the piping 64' to the coil 66' of the refrigeration cooler, and flows through all subsequent parts of the standby unit 52, as in the case of the standby unit 42 described in FIG. 2.

Because of the different kind of dehumidifier used in FIG. 3, there is no adsorbent material which must be kept dry in FIG. 3, but the flow of a limited amount of dry air from the primary system 50 through the various elements of the standby system 52 imposes a low load on the refrigeration air dryer, so that it does not reach extremely low temperatures which would cause substantial frosting and possible freeze-up. It will be evident that when a refrigeration air dryer is used for a standby unit, the refrigeration must be kept in operation at all times, since the time required to get the dryer into operation would be excessive and unacceptable in a standby unit which must go into operation instantly where continuous supply of dry air is critical.

The compressors 11c and 11d are driven by electric motors, as shown diagrammatically in FIG. 3. It is not necessary to run the motor 11d when the standby unit is not being used, because the motor and compressor 11d will come up to full speed and full air delivery almost instantaneously when power is supplied to the motor from a motor control designated by the reference character 84. This motor control also controls the valve 60 and closes the valve 60 when the humidity alarm sensor #1 in the primary system signals an excessive humidity, indicating failure of the operation of the primary unit 50.

It will be understood that the humidity alarm sensor 26c is representative of means for detecting failure in the operation of the primary unit 50. Humidity is, of course, critical in a system for delivering dry air; but drop in air pressure is another result which is monitored on any system which supplies compressed gas or air for critical uses, and such low-pressure alarms are well understood in the art and are not illustrated in the drawing.

When the primary system 50 is supplying air, the valve 24c is open to the piping 78 leading to the location of low-pressure air. At the same time, the valve 24d is open to a flow control 86 so that dry air can escape through the valve 24d and thus maintain a minimum flow through the various parts of the standby system 52.

When detection equipment of the primary system 50 signals a failure of the system, the solenoid-operated valve 24c shuts off flow to the pipe 78 and opens the valve to flow to an exhaust system 88. This failure of the primary system also operates the valve 24d to shut off the flow through the flow control 86 and to connect the standby system with the pipe 78.

The preferred embodiments of the invention have been illustrated and described, but changes and modifications can be made, and some features can be used in different combinations without departing from the invention as defined in the claims.

What is claimed is:

1. In a gas-drying system including two dehumidifiers, one of which operates as a primary system and the other of which serves as a standby back-up system, and each of which includes an air dryer unit and each of which constitutes a self-contained system that can supply the full demand for dry gas to a place of use when the other system is not in operation and for indefinite periods of time such as a day or a plurality of successive days, each dehumidifier having means for connecting it with a source of gas, to be dehumidified, the improvement which comprises a bleed connection through which gas flows from the downstream side of the air dryer unit of the primary dehumidifier to the upstream side of the air dryer unit of the standby system when said standby system is not in operation but ready to operate for supplying the full demand for dry gas to the place of use when and if the primary system is shut down because of mechanical failure or for other reasons, piping through which both the primary system and the standby system can supply dry gas to the same place of use, and means for supplying through said bleed connection, a predetermined amount of dry gas when the primary system is in operation, and the standby system is not in operation, to maintain dynamic conditions necessary to keep the standby system in ready condition for instant takeover from the primary system when the primary system is suddenly shut down.

2. The gas-drying system described in claim 1, characterized by the bleed connection entering the standby system downstream from the source of gas for the standby system, and means for preventing backflow of gas from the bleed connection to the source of gas for the standby system.

3. The gas-drying system described in claim 2, characterized by a valve in the standby system between the source of gas for the standby system and the bleed connection for preventing the flow of gas from the bleed connection to the source of gas for the standby system, and means for regulating the amount of gas supplied to the standby system through said bleed connection.

4. The gas-drying system described in claim 3 characterized by said means for regulating being a pressure-regulator in series with the bleed connection, and of a type that receives gas under pressure and that delivers gas under a controlled and reduced pressure on the downstream side of the regulator.

5. The gas-drying system described in claim 1 characterized by both the primary and the secondary systems communicating with common piping through which dry gas flows from either system to the place of use of the dry gas, and valves on opposite sides of the common piping and between the primary and secondary systems, respectively, each of the valves being a check valve that closes to stop backflow from said common piping toward either of the primary and secondary systems.

6. The gas-drying system described in claim 5 characterized by the bleed connection being independent from the connections of the primary and secondary systems to the common piping, and a check valve in the bleed connection that closes to stop flow of gas from the secondary system toward the primary system.

7. The gas-drying system described in claim 1 characterized by the standby system including an adsorptive gas dryer, and means in the bleed connection for supplying sufficient dry gas from the primary system to maintain the gas dryer of the standby system in a dry condition and ready for instant use when the standby system is called into operation in an emergency.

8. The gas-drying system described in claim 7 characterized by the standby system including a refrigeration air dryer and means for supplying sufficient dry gas from the primary system to maintain some continuous load on the refrigeration gas dryer to prevent frosting or freeze-up that would delay proper functioning of the standby system if called into operation in an emergency.

9. The gas-drying system described in claim 1 characterized by the standby system including a high humidity alarm through which the dry gas from the bleed connection flows to keep the alarm in condition for instant use if the standby system is called into operation in an emergency.

10. The gas-drying system described in claim 1 characterized by both the primary and the standby systems including a refrigeration gas dryer, an economizer heat exchanger with one side through which gas under pressure flows to the dryer, and another side through which gas from the downstream side of the refrigeration gas dryer flows in thermal communication with the gas flowing to the upstream side of the dryer, and the bleed conduit leading from a location downstream from the heat exchanger of the primary system to a location upstream of the heat exchanger and refrigeration gas dryer of the standby system.

11. The gas-drying system described in claim 1 characterized by the primary system and the standby system each having a motor-driven air compressor that serves as the source of gas under pressure, and each having some chamber capacity for storing some air under substantial pressure, the piping for supplying gas to the place of use being in direct communication with the systems where the air is under substantial pressure, and portions of both systems beyond said piping including a pressure regulator for receiving the gas at said substantial pressure and delivering the gas at a reduced pressure, and other piping through which the primary system delivers air at the reduced pressure to a second place of use, and the standby system having other piping for delivering air at the reduced pressure to the second place of use.

12. The gas-drying system described in claim 11 characterized by the standby system having its connection with the bleed connection at a location that permits the dry gas bled from the primary unit to flow through the entire gas circuit of the standby unit, except the portion through which gas is supplied to the standby system when the standby system is in operation.

13. The gas-drying system described in claim 1 characterized by a high humidity alarm in contact with the dry gas in the primary system, controls connected with said alarm and with the standby system for shutting off delivery from the primary system and putting the standby system into operation as a substitute for the primary system.

* * * * *